US010107293B2

(12) United States Patent
Kinoshita et al.

(10) Patent No.: US 10,107,293 B2
(45) Date of Patent: Oct. 23, 2018

(54) ELECTRIC COMPRESSOR

(71) Applicant: KABUSHIKI KAISHA TOYOTA JIDOSHOKKI, Aichi-ken (JP)

(72) Inventors: Yusuke Kinoshita, Aichi-ken (JP); Ken Suitou, Aichi-ken (JP); Tatsuya Koide, Aichi-ken (JP); Junya Yano, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 253 days.

(21) Appl. No.: 15/082,101

(22) Filed: Mar. 28, 2016

(65) Prior Publication Data

US 2016/0290347 A1    Oct. 6, 2016

(30) Foreign Application Priority Data

Mar. 30, 2015    (JP) .................................. 2015-069889

(51) Int. Cl.
H02K 11/00    (2016.01)
F04D 25/06    (2006.01)
H02K 5/22    (2006.01)
H01R 13/187    (2006.01)

(52) U.S. Cl.
CPC ....... F04D 25/0693 (2013.01); H01R 13/187 (2013.01); H02K 5/225 (2013.01)

(58) Field of Classification Search
CPC .... H02K 5/225; H02K 3/522; F04D 25/0693; F04D 29/40

USPC ....................................... 310/71; 417/423.14
See application file for complete search history.

(56) References Cited

U.S. PATENT DOCUMENTS

| 4,462,657 | A | 7/1984 | Snowdon et al. |
| 5,921,803 | A | 7/1999 | Mori |
| 7,197,892 | B2 * | 4/2007 | Ioi ........................... F04B 35/04 310/85 |
| 9,246,320 | B2 * | 1/2016 | Yamada .................. F04B 35/04 |

(Continued)

FOREIGN PATENT DOCUMENTS

| JP | 5-33465 | 4/1993 |
| JP | 05-256261 | 10/1993 |

(Continued)

Primary Examiner — Hanh Nguyen
(74) Attorney, Agent, or Firm — Greenblum & Bernstein, P.L.C.

(57) ABSTRACT

An electric compressor has a hermetic terminal unit that is electrically connected to a motor side wire and a drive circuit side wire and inserted through a through hole formed through a separation wall separating a motor chamber and an accommodating chamber. The hermetic terminal unit has a first connecting terminal that is electrically connected to the motor side wire and elastically deformable, a second connecting terminal that is electrically connected to the drive circuit side wire and elastically deformable, and a conductive member that is fitted to the first connecting terminal and the second connecting terminal and electrically connects the first connecting terminal and the second connecting terminal. The first connecting terminal is elastically deformed and holds the motor side wire by a restoring force thereof. The second connecting terminal is elastically deformed and holds the drive circuit side wire by a restoring force thereof.

6 Claims, 6 Drawing Sheets

(56) References Cited

U.S. PATENT DOCUMENTS

| | | | | |
|---|---|---|---|---|
| 2009/0304536 A1* | 12/2009 | Egawa | ............... | F04C 18/0215 |
| | | | | 417/423.14 |
| 2011/0058973 A1* | 3/2011 | Yamada | ............... | F04C 23/008 |
| | | | | 418/55.1 |
| 2011/0062809 A1* | 3/2011 | Watanabe | ............... | F04B 35/04 |
| | | | | 310/71 |
| 2011/0243769 A1* | 10/2011 | Yamada | ................ | F04B 35/04 |
| | | | | 417/410.1 |
| 2012/0230849 A1* | 9/2012 | Yamada | ................ | F04B 35/04 |
| | | | | 417/410.1 |

FOREIGN PATENT DOCUMENTS

| | | |
|---|---|---|
| JP | 8-222314 | 8/1996 |
| JP | 2002-161857 | 6/2002 |

\* cited by examiner

ELECTRIC COMPRESSOR

BACKGROUND OF THE INVENTION

The present invention relates to an electric compressor.

There is known an electric compressor that includes a compression mechanism compressing refrigerant and an electric motor driving the compression mechanism. The electric compressor further includes a housing having therein a motor chamber accommodating the electric motor. A cover is mounted to the outer surface of the housing. An accommodating chamber is formed between the outer surface of the housing and the cover. The accommodating chamber accommodates a motor drive circuit driving the electric motor. Japanese Patent Application Publication No. H05-256261 discloses a power supply glass terminal (hermetic terminal unit) through which electric power from the motor drive circuit is supplied to the electric motor.

FIG. 6 is a partially enlarged sectional view of an electric compressor according to a background art. In FIG. 6, 100 designates a housing of the electric compressor having a separation wall 100A. A hole 103 is formed through the separation wall 100A and a circuit board 104 is fitted in the hole 103. A seal member 105 is disposed between the circuit board 104 and the hole 103 to seal between the circuit board 104 and the hole 103. The circuit board 104 has therein three holes 104H and a conductive pin 106 (conductive member) is inserted in each hole 104H. One end 106A of the conductive pin 106 extends into a motor chamber 102. The other end 106B of the conductive pin 106 extends into an accommodating chamber 101. Each conductive pin 106 and its corresponding hole 104H are insulated by an insulator 107 made of glass. The insulator 107 seals between the conductive pin 106 and the hole 104H. The circuit board 104 holds the conductive pins 106 through the respective insulators 107.

The motor chamber 102 has therein a resin cluster block 110. The cluster block 110 has therein three holes 110H. Half-cylindrical connecting terminals 111 are accommodated in the respective holes 110H. Each connecting terminal 111 has at one end thereof a first elastic connecting portion 111A that is partially curved inward and at the other end thereof a second elastic connecting portion 111B that is is partially curved inward. Any two adjacent connecting terminals 111 are insulated by a part of the cluster block 110 having therein the respective holes 110H.

Three motor side wires 108 extend from the electric motor. The ends 108E of the respective motor side wires 108 that are opposite to the electric motor are inserted into their corresponding holes 110H of the cluster block 110 and then into the first connecting portions 111A of the connecting terminals 111 for electrical connection therewith. With the ends 108E of the motor side wires 108 thus inserted in the first connecting portions 111A, the first connecting portions 111A are elastically deformed to expand outward and hold the respective motor side wires 108 by the restoring force.

The one ends 106A of the conductive pins 106 are inserted into the respective holes 110H of the cluster block 110 from the side opposite to the electric motor and then into the respective second connecting portions 111B of the connecting terminals 111 for electrical connection therewith. With the one ends 106A of the conductive pins 106 thus inserted in the respective second connecting portions 111B, the second connecting portions 111B are elastically deformed to expand outward and hold the respective conductive pins 106 by the restoring force.

A resin inner connector 120 is provided in the accommodating chamber 101. The inner connector 120 has therein three accommodation recesses 120H. Each accommodation recess 120H accommodates a cylindrical connecting terminal 121. The connecting terminal 121 has an elastic portion 121A that has a substantially cylindrical shape and is elastically deformable to be curved inward. Any two adjacent connecting terminals 121 are insulated by a part of the inner connector 120 having therein the respective accommodation recesses 120H.

The other ends 106B of the conductive pins 106 are inserted in the connecting terminals 121 in the respective accommodation recesses 120H of the inner connector 120 for electrical connecting thereof. With the other ends 106B of the conductive pins 106 inserted in the respective connecting terminals 121, the elastic portions 121A are elastically deformed to expand outward and hold the respective conductive pins 106 by the restoring force. The connecting terminals 121 are electrically connected to a motor drive circuit through drive circuit side wires 122. Thus, the motor drive circuit supplies electric power to the electric motor through the drive circuit side wires 122, the connecting terminals 121, the conductive pins 106, the connecting terminals 111, and the motor side wires 108.

In the electric compressor described above, the cluster block 110 and the inner connector 120 are required to connect the conductive pins 106 of the hermetic terminal unit to the motor side wires 108 and the drive circuit side wires 122. As a result, the number of the parts of the electric compressor is increased.

The present invention which has been made in light of the above problem is directed to providing an electric compressor which reduces the number of the parts of the electric compressor.

SUMMARY OF THE INVENTION

In accordance with one aspect of the present invention, there is provided an electric compressor having a housing, a compression mechanism accommodated in the housing and compressing refrigerant, an electric motor driving the compression mechanism, a motor chamber formed in the housing to accommodate the electric motor, a cover mounted to the housing, an accommodating chamber formed between the housing and the cover, a motor drive circuit accommodated in the accommodating chamber and driving the electric motor, a separation wall forming part of the housing and separating the motor chamber and the accommodating chamber, a through hole formed through the separation wall, a motor side wire that is electrically connected to the electric motor, a drive circuit side wire that is electrically connected to the motor drive circuit, a hermetic terminal unit that is electrically connected to the motor side wire and the drive circuit side wire and inserted through the through hole, and a seal member provided between the hermetic terminal unit and an inner wall forming the through hole. The hermetic terminal unit has a first connecting terminal that is electrically connected to the motor side wire and elastically deformable, a second connecting terminal that is electrically connected to the drive circuit side wire and elastically deformable, and a conductive member that is fitted to the first connecting terminal and the second connecting terminal and electrically connects the first connecting terminal and the second connecting terminal. The first connecting terminal is elastically deformed and holds the motor side wire by a restoring force thereof. The second connecting terminal is elastically deformed and holds the drive circuit side wire by a restoring force thereof.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

First Embodiment

Figure 1:
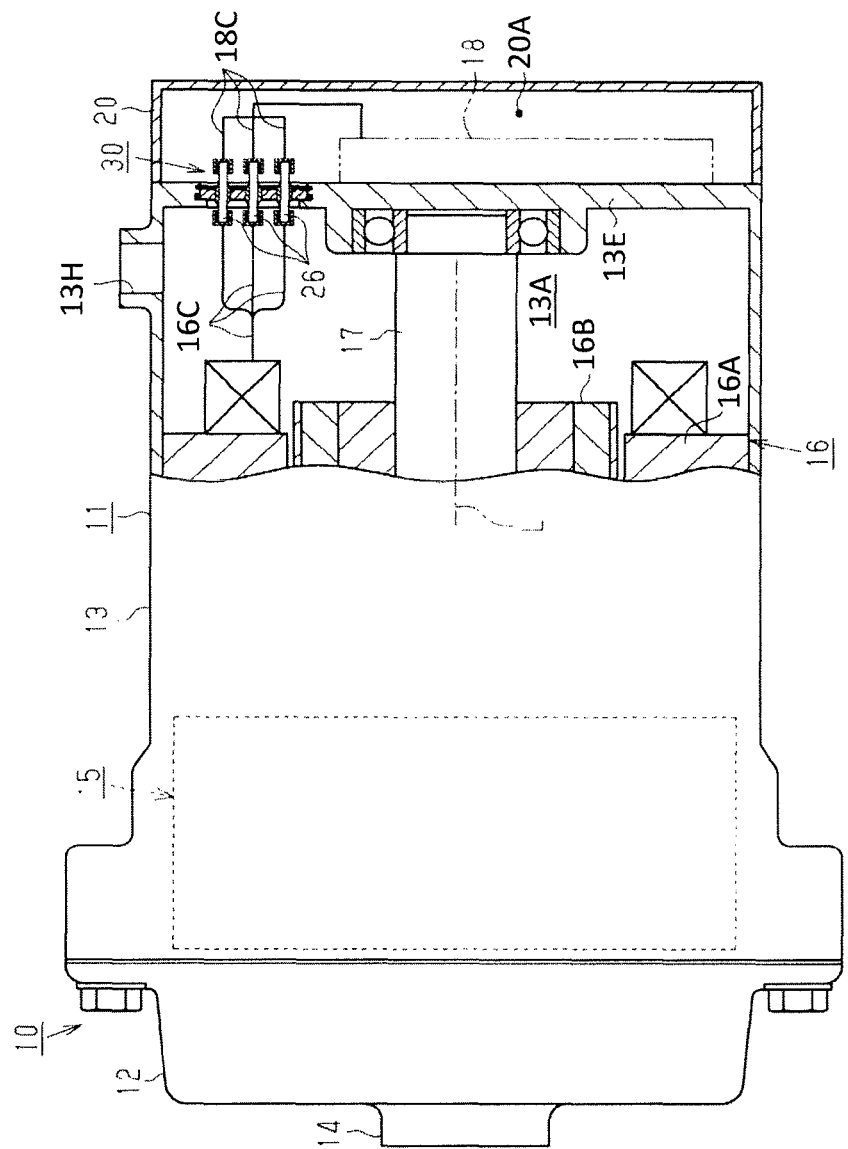
FIG. 1 is a partially sectional cutaway side view showing an electric compressor according to a first embodiment of the present invention.
Figure 2:
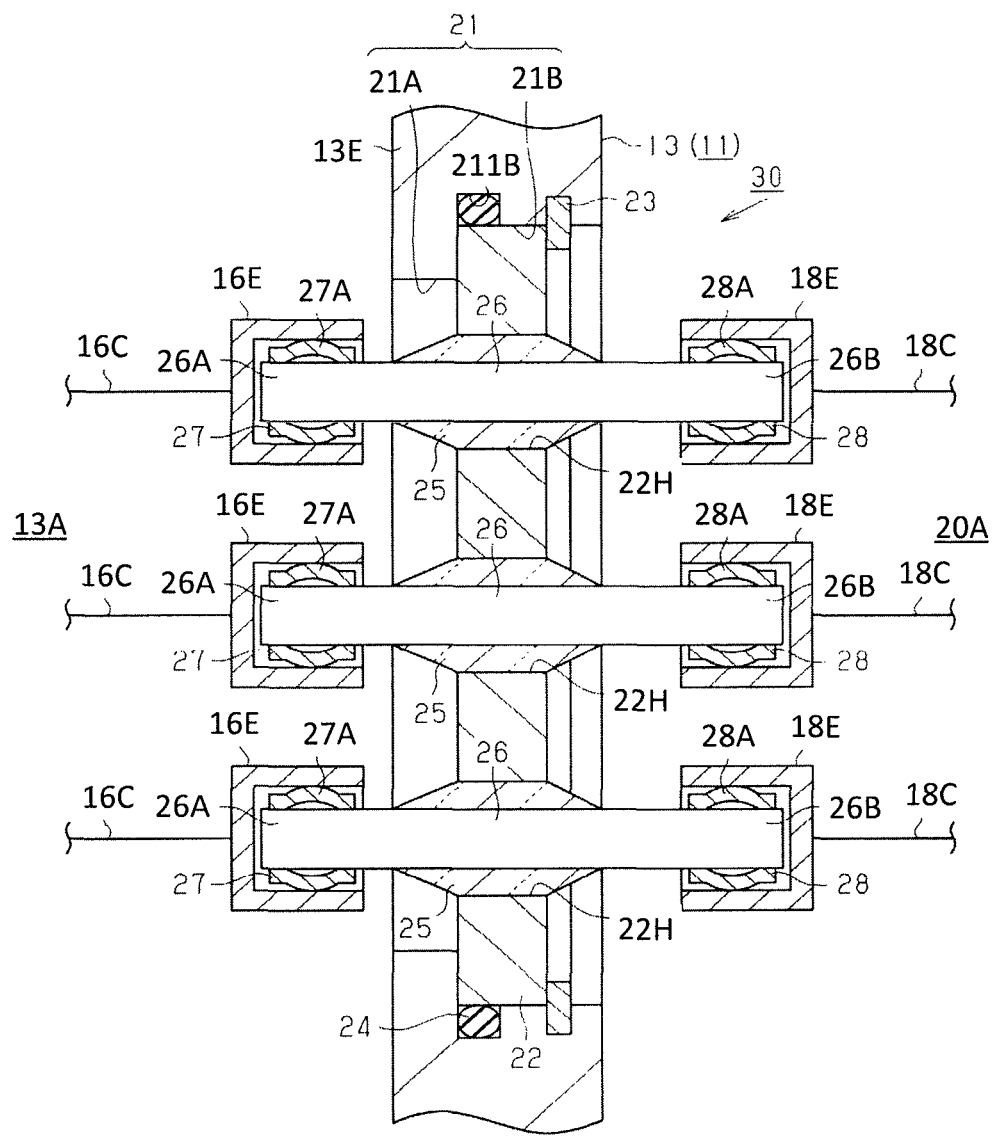
FIG. 2 is a partially sectional enlarged view showing a hermetic terminal unit of the electric compressor of FIG. 1.
Figure 3:
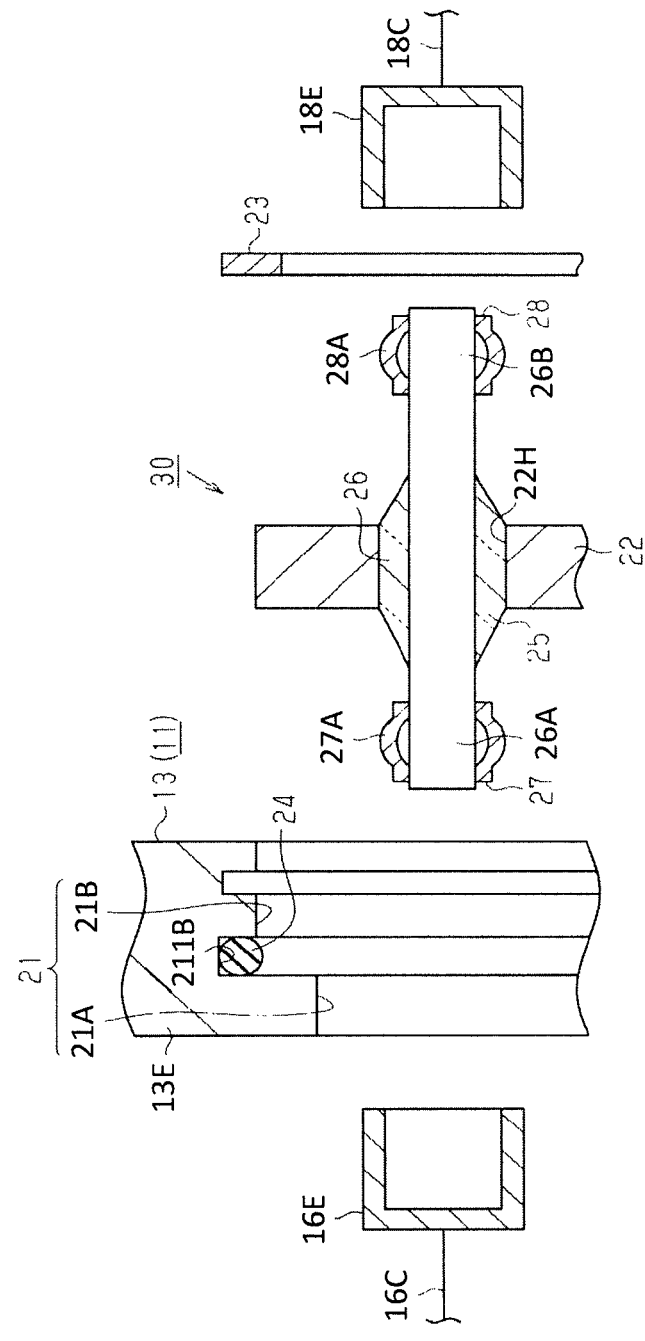
FIG. 3 is a partially sectional exploded view showing the hermetic terminal unit of FIG. 2.

The following will describe an electric compressor according to a first embodiment of the present invention with reference to FIGS. 1 through 3. The electric compressor of the first embodiment is a type that is applied to a vehicle air conditioner.

Referring to FIG. 1, the electric compressor is generally designated by reference numeral 10 and includes a housing 11. The housing 11 includes a discharge housing 12 that has a bottomed cylindrical shape and is made of metal such as aluminum, and a suction housing 13 that has a bottomed cylindrical shape and is made of metal such as aluminum and connected to the discharge housing 12. The suction housing 13 has therethrough an inlet port 13H that is connected to an external refrigerant circuit (not shown). The discharge housing 12 has therethrough an outlet port 14 that is connected to the external refrigerant circuit.

The electric compressor 10 further includes a compression mechanism 15 (shown by dashed line in FIG. 1) accommodated in the suction housing 13 and compressing refrigerant and an electric motor 16 driving the compression mechanism 15. The suction housing 13 has therein a motor chamber 13A accommodating the electric motor 16. A rotary shaft 17 is rotatably supported in the suction housing 13. Though illustration is omitted in the present embodiment, the compression mechanism 15 includes a fixed scroll fixed in the suction housing 13 and a movable scroll disposed facing the fixed scroll. The electric motor 16 includes a stator 16A fixed to the inner periphery of the suction housing 13 and a rotor 16B fixed on the rotary shaft 17.

The suction housing 13 has an end wall 13E on the side opposite side to the discharge housing 12. A cover 20 that has a bottomed cylindrical shape and is made of metal such as aluminum is mounted to the end wall 13E of the suction housing 13. An accommodating chamber 20A is formed between the end wall 13E and the cover 20 and accommodates therein a motor drive circuit 18 driving the electric motor 16. The motor drive circuit 18 includes a circuit board on which a drive control circuit (inverter circuit) of the electric motor 16 is mounted, and, electric elements such as a plurality of switching elements and a plurality of capacitors are mounted. In the electric compressor according to the present embodiment, the compression mechanism 15, the electric motor 16, and the motor drive circuit 18 are disposed in this order in the direction of the axis L of the rotary shaft 17. The end wall 13E of the suction housing 13 serves as a wall separating the motor chamber 13A and the accommodating chamber 20A.

The electric compressor 10 further includes a plurality of motor side wires 16C (three wires in the present embodiment) electrically connected to the electric motor 16. The motor side wires 16C extend out from a U-phase coil, a V-phase coil, and a W-phase coil of the electric motor 16. The electric compressor 10 includes a plurality of drive circuit side wires 18C (three wires in the present embodiment) electrically connected to the motor drive circuit 18.

Referring to FIG. 2, the end wall 13E of the suction housing 13 has therethrough a through hole 21. The through hole 21 is formed in a stepped shape, including a small-diameter hole 21A and a large-diameter hole 21B that is larger than the small-diameter hole 21A. The small-diameter hole 21A and the large-diameter hole 21B are continuously formed in the thickness direction of the end wall 13E. The small-diameter hole 21A is formed on the side of the end wall 13E that is adjacent to the motor chamber 13A. The large-diameter hole 21B is formed at a position adjacent to the accommodating chamber 20A to be in communication with the small-diameter hole 21A. A support member 22 is fitted in the large-diameter hole 21B and prevented from falling off from the large-diameter hole 21B by a circlip 23. The support member 22 may be fixed to the end wall 13E by a bolt.

An annular seal member 24 is provided in a seal accommodating chamber 211B formed between the outer peripheral surface of the support member 22 and the inner wall forming the large-diameter hole 21B. Specifically, in the electric compressor according to the present embodiment, the seal accommodating chamber 211B is formed by a space that is recessed radially outward from a part of the inner peripheral surface of the inner wall forming the large-diameter hole 21B. The seal member 24 seals between the motor chamber 13A and the accommodating chamber 20A by sealing between the support member 22 and the inner wall forming the large-diameter hole 21B (the through hole 21). The support member 22 is a part of a hermetic terminal unit 30 that will be described later. The seal member 24 is provided between the hermetic terminal unit 30 and the inner wall forming the through hole 21. As long as sealing between the motor chamber 13A and the accommodating chamber 20A is accomplished, a gasket may be used instead of the seal member 24.

The support member 22 has therethrough three insertion holes 22H. Three pillared conductive members 26 are inserted through the respective insertion holes 22H. Each conductive member 26 is fixed to the support member 22 by an adhesive member 25 that is provided between the inner wall forming the insertion hole 22H of the support member 22 and the outer peripheral surface of the conductive member 26 and serves as a second seal member. In the electric compressor according to the present embodiment, the adhesive member 25 is made of glass. As long as the conductive member 26 is fixed to the support member 22 by the adhesive member 25 and the adhesive member 25 seals between the motor chamber 13A and the accommodating chamber 20A, the adhesive member 25 may be made of adhesive or rubber. In the case that the support member 22 is made of metal, the adhesive member 25 needs to have insulating property. One ends 26A of the conductive members 26 extend into the motor chamber 13A, while the other ends 26B extend into the accommodating chamber 20A.

Referring to FIG. 3, a cylindrical first connecting terminal 27 is mounted to the one end 26A of the conductive member 26 and electrically connected to the motor side wire 16C. Specifically, the one end 26A of the conductive member 26 is inserted in the first connecting terminal 27, and the first connecting terminal 27 is mounted to the one end 26A of the conductive member 26 and electrically connected to the conductive member 26. The first connecting terminal 27 has an elastic portion 27A that is expandable outward and elastically deformable inward.

A cylindrical second connecting terminal 28 is mounted to the other end 26B of the conductive member 26 and electrically connected to the drive circuit side wire 18C. Specifically, the other end 26B of the conductive member 26 is inserted in the second connecting terminal 28, and the second connecting terminal 28 is mounted to the other end 26B of the conductive member 26 and electrically connected to the conductive member 26. The second connecting terminal 28 has an elastic portion 28A that is expandable outward and elastically deformable inward. The conductive member 26, the first connecting terminal 27, and the second connecting terminal 28 are separate parts.

As describe above, the conductive member 26 is provided between the first connecting terminal 27 and the second connecting terminal 28 and electrically connects the first connecting terminal 27 and the second connecting terminal 28. The conductive member 26 is fitted to the first connecting terminal 27 and the second connecting terminal 28. In the electric compressor according to the present embodiment, the support member 22, the conductive members 26, the first connecting terminals 27, the second connecting terminals 28, and the adhesive members 25 cooperate to form the hermetic terminal unit 30.

The motor side wire 16C has at the end opposite to the electric motor 16 a recessed female terminal 16E. The female terminal 16E is fitted around the first connecting terminal 27. Specifically, with the first connecting terminal 27 inserted in the female terminal 16E, the elastic portion 27A is urged inward by the inner wall of the female terminal 16E and elastically deformed inward. As a result, the elastic portion 27A presses the inner wall of the female terminal 16E by the restoring force thereby to hold the female terminal 16E. Thus, the female terminal 16E is fitted around the first connecting terminal 27, and the motor side wire 16C and the first connecting terminal 27 are electrically connected.

A recessed female terminal 18E is provided at the end of the drive circuit side wire 18C that is opposite to the motor drive circuit 18. The female terminal 18E is fitted around the second connecting terminal 28. Specifically, with the second connecting terminal 28 inserted in the female terminal 18E, the elastic portion 28A is urged inward by the inner wall of the female terminal 18E and elastically deformed inward. As a result, the elastic portion 28A presses the inner wall of the female terminal 18E by the restoring force thereby to hold the female terminal 18E. Thus, the female terminal 18E is fitted around the second connecting terminal 28, and the drive circuit side wire 18C and the second connecting terminal 28 are electrically connected.

As described above, in the electric compressor according to the present embodiment, the first connecting terminal 27 is inserted in the female terminal 16E of the motor side wire 16C and connected to the motor side wire 16C and the second connecting terminal 28 is inserted in the female terminal 18E of the drive circuit side wire 18C and connected to the drive circuit side wire 18C. That is, the structure for connecting the first connecting terminal 27 to the motor side wire 16C is substantially the same as that for connecting the second connecting terminal 28 to the drive circuit side wire 18C.

The following will describe the operation of the electric compressor 10 according to the first embodiment. The female terminal 16E is fitted around the first connecting terminal 27 and the motor side wire 16C is electrically connected to the first connecting terminal 27 through the female terminal 16E. The female terminal 18E is fitted around the second connecting terminal 28 and the drive circuit side wire 18C is electrically connected to the second connecting terminal 28 through the female terminal 18E. The electric motor 16 is supplied with electric power from the motor drive circuit 18 through the drive circuit side wires 18C, the second connecting terminals 28, the conductive members 26, the first connecting terminals 27, and the motor side wires 16C. Thus, the electric motor 16 drives to rotate the rotary shaft 17 and the compression mechanism 15 is operated for compression.

The first embodiment of the present invention offers the following advantageous effects.

(1) The hermetic terminal unit 30 includes the first connecting terminals 27 that are electrically connected to the motor side wires 16C and elastically deformable, the second connecting terminals 28 that are electrically connected to the drive circuit side wires 18C and elastically deformable, and the conductive members 26 that are provided between the first connecting terminals 27 and the second connecting terminals 28 and electrically connects the first connecting terminals 27 and the second connecting terminals 28. Each first connecting terminal 27 is elastically deformed and holds the motor side wire 16C by the restoring force. Each second connecting terminal 28 is also elastically deformed and holds the drive circuit side wire 18C by the restoring force. Thus, the conductive members 26 of the hermetic terminal unit 30 are connected to the motor side wires 16C and the drive circuit side wires 18C. Therefore, the electric compressor 10 according to the first embodiment may dispense with a cluster block or an inner connector. As a result, the number of the parts of the electric compressor 10 may be reduced.

(2) The structure for connecting the first connecting terminal 27 to the motor side wire 16C is substantially the same as that for connecting the second connecting terminal 28 to the drive circuit side wire 18C. Thus, the hermetic terminal unit 30 can be provided in the through hole 21 without considering the orientation of the hermetic terminal unit 30 relative to the through hole 21. Therefore, the workability in assembling the hermetic terminal unit 30 in the through hole 21 is improved.

(3) The conductive member 26 is of a pillar shape. The one end 26A of the conductive member 26 extends into the motor chamber 13A and the other end 26B extends into the accommodating chamber 20A, respectively. The first connecting terminal 27 is provided at the one end 26A of the conductive member 26 and the second connecting terminal 28 is provided at the other end 26B, respectively. According to the above configuration, existing conductive members may be used for the conductive member 26 by connecting one end thereof to the first connecting terminal 27 and the other end thereof to the second connecting terminal 28, respectively and, therefore, the structure of the electric compressor 10 may be simplified.

(4) The hermetic terminal unit 30 includes the support member 22 having therethrough the plural insertion holes 22H through which the conductive members 26 are inserted. The seal member 24 is provided between the support member 22 and the inner wall forming the through hole 21. The adhesive members 25 are provided between the inner wall forming of the insertion holes 22H and the conductive members 26. Such configuration is suitable for an electric compressor such as 10 in which the electric motor 16 has the U-phase coil, the V-phase coil, and the W-phase coil and the plural motor side wires 16C are electrically connected to their corresponding phase coils.

(5) The elastic portions 27A, 28A are pressed against the female terminals 16E, 18E and elastically deformed inward, thereby to hold the female terminals 16E, 18E, respectively, by the restoring force. Elastic deformation of the elastic portions 27A, 28A does not move the adjacent elastic portions 27A, 28A closer to each other and, therefore, the insulation between the adjacent elastic portions 27A, 28A is easily secured. In the electric compressor 10 according to the present embodiment, the adjacent elastic portions 27A, 28A may be disposed close to each other. As a result, the electric compressor 10 can be made smaller in size.

Second Embodiment

Figure 4:
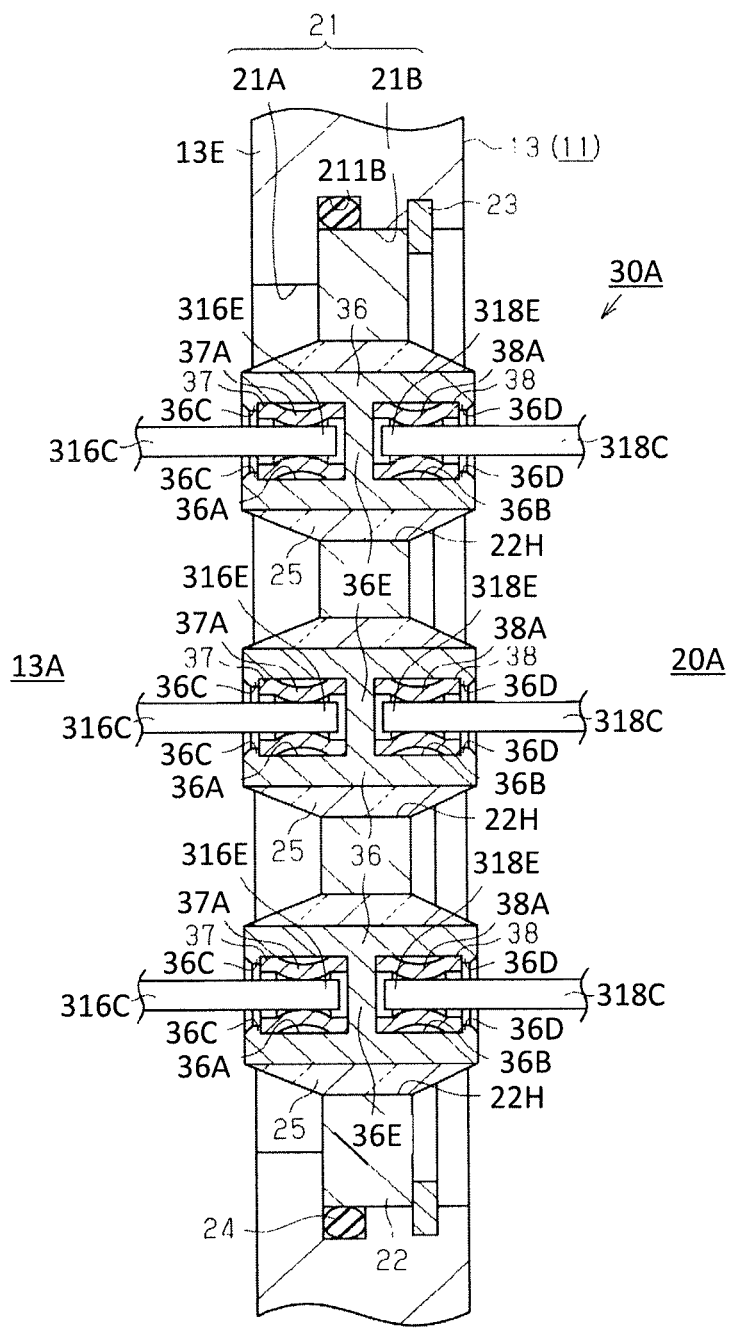
FIG. 4 is a partially sectional enlarged view showing a hermetic terminal unit of an electric compressor according to a second embodiment of the present invention.
Figure 5:
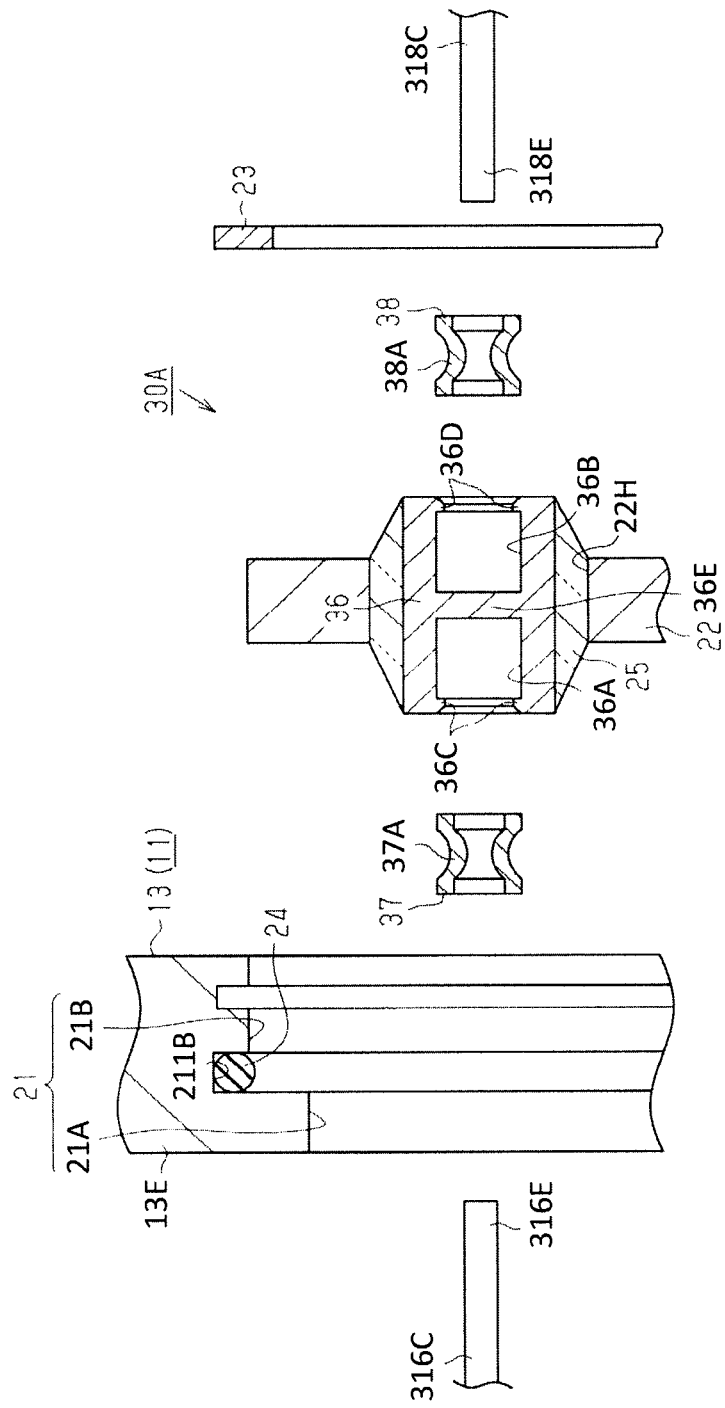
FIG. 5 is a partially sectional exploded view showing the hermetic terminal unit FIG. 4.
Figure 6:
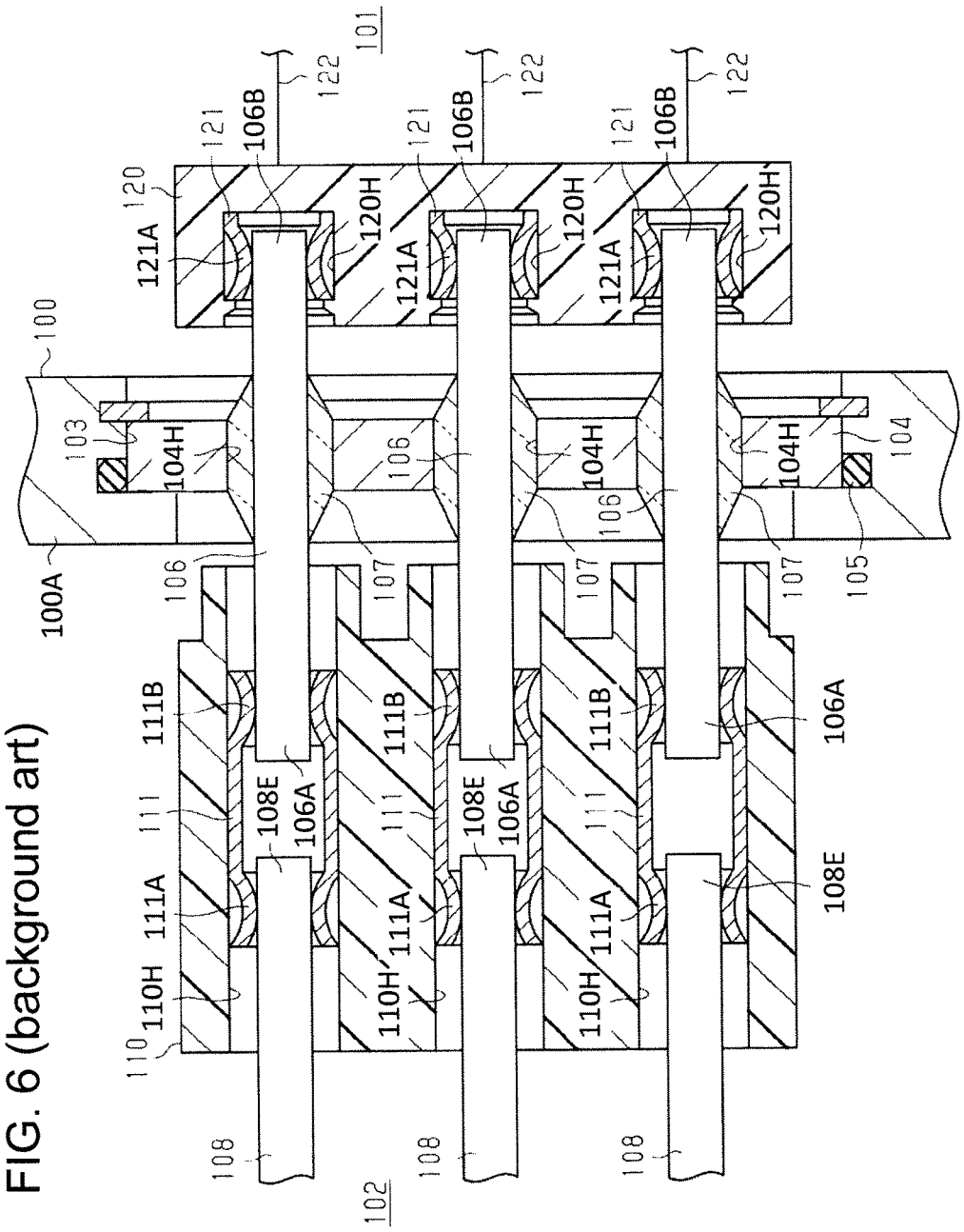
FIG. 6 is a partially enlarged sectional view of an electric compressor according to a background art.

The following will describe an electric compressor 10 according to a second embodiment of the present invention with reference to FIGS. 4 and 5. In the following description of the second embodiment, the same reference numerals denote the same or similar elements or components as the first embodiment, and the description thereof will be omitted.

As shown in FIGS. 4 and 5, numeral 36 designates the conductive members 36, and each of three conductive members 36 has a first recess 36A that opens toward the motor chamber 13A and accommodates therein a first connecting terminal 37 of a substantially cylindrical shape and a second recess 36B that opens toward the accommodating chamber 20A and accommodates therein a second connecting terminal 38 of a substantially cylindrical shape. The second recess 36B and the first recess 36A are formed separately in the conductive member 36. Specifically, the cylindrical conductive member 36 has in one end thereof in the axial direction thereof the first recess 36A and in the other end thereof the second recess 36B that is not in communication with the first recess 36A. That is, the first recess 36A and the second recess 36B are separated by a bottom wall 36E including the bottom surface of the first recess 36A and the bottom surface of the second recess 36B.

As shown in FIG. 4, the first recess 36A has therein the first connecting terminal 37 that is electrically connected to a motor side wire 316C and the conductive member 36. The second recess 36B has therein the second connecting terminal 38 that is electrically connected to a drive circuit side wire 318C and the conductive member 36.

The first connecting terminal 37 is of a cylindrical shape and has therein a first inserting portion 37A that is recessed inward and elastically deformable outward. The motor side wire 316C is inserted in the first inserting portion 37A. The second connecting terminal 38 is of a cylindrical shape and has therein a second inserting portion 38A that is recessed inward and elastically deformable outward. The drive circuit side wire 318C is inserted in the second inserting portion 38A.

The conductive member 36 has at the opening of the first recess 36A thereof a pair of projections 36C extending in the direction perpendicular to the axial direction of the motor side wire 316C. With the first connecting terminal 37 set in the first recess 36A, the projections 36C are in contact with the first connecting terminal 37 to prevent the first connecting terminal 37 from being slipped out of the first recess 36A.

The conductive member 36 has at the opening of the second recess 36B thereof a pair of projections 36D extending in the direction perpendicular to the axial direction of the motor side wire 316C. With the second connecting terminal 38 set in the second recess 36B, the projections 36D are in contact with the second connecting terminal 38 to prevent the second connecting terminal 38 from being slipped out of the second recess 36B.

As described above, the conductive member 36 is provided between and electrically connects the first and second connecting terminals 37, 38. The conductive member 36 is fitted to the first and second connecting terminals 37, 38. In the electric compressor 10 according to the present embodiment, the support member 22, the conductive members 36, the first connecting terminals 37, the second connecting terminals 38, and the adhesive members 25 cooperate to form the hermetic terminal unit 30A.

An end 316E of the motor side wire 316C on the side opposite to the electric motor 16 has a pillar shape and is inserted in the first inserting portion 37A. Then, the first inserting portion 37A is elastically deformed outward by the end 316E of the motor side wire 316C and the end 316E of the motor side wire 316C is held in a sandwiching manner by the restoring force of the first inserting portion 37A. Thus, the motor side wire 316C and the first connecting terminal 37 are electrically connected to each other.

An end 318E of the drive circuit side wire 318C on the side opposite to the motor drive circuit 18 has a pillar shape and is inserted in the second inserting portion 38A. Then, the second inserting portion 38A is elastically deformed outward by the end 318E of the drive circuit side wire 318C and the end 318E of the drive circuit side wire 318C is held in a sandwiching manner by the restoring force of the second inserting portion 38A. Thus, the drive circuit side wire 318C and the second connecting terminal 38 are electrically connected to each other.

As described above, in the electric compressor 10 according to the present embodiment, the motor side wire 316C is inserted in the first inserting portion 37A of the first connecting terminal 37 and connected to the first connecting terminal 37. The drive circuit side wire 318C is inserted in the second inserting portion 38A of the second connecting terminal 38 and connected to the second connecting terminal 38. That is, the structure for connecting the first connecting terminal 37 to the motor side wire 316C is substantially the same as that for connecting the second connecting terminal 38 to the drive circuit side wire 318C.

The following will describe the operation of the electric compressor 10 according to the second embodiment. Electrical connection of the motor side wire 316C to the first connecting terminal 37 is accomplished by inserting the end 316E of the motor side wire 316C into the first connecting terminal 37. Electrical connection of the motor side wire 318C to the second connecting terminal 38 is accomplished by inserting the end 318E of the motor side wire 318C into the second connecting terminal 38. The electric motor 16 is supplied with electric power from the motor drive circuit 18 through the drive circuit side wires 318C, the second connecting terminals 38, the conductive members 36, the first connecting terminals 37, and the motor side wires 316C. Thus, the electric motor 16 drives to rotate the rotary shaft 17 and the compression mechanism 15 is operated for compression.

The second embodiment of the present invention offers the following advantageous effects in addition to the effects (1), (2), and (5) of the first embodiment.

(6) The conductive member 36 has therein the first and the second recesses 36A, 36B that are formed separately each other. Specifically, the first and the second recesses 36A, 36B are separated by the bottom wall 36E in the conductive member 36. The first connecting terminal 37 has the first inserting portion 37A in which the end 316E of the motor side wire 316C is inserted and the second connecting terminal 38 has the second inserting portion 38A in which the end 318E of the drive circuit side wire 318C is inserted. Thus, the end 316E of the motor side wire 316C can be formed in a pillar shape so as to be inserted in the first inserting portion 37A and the end 318E of the drive circuit side wire 318C can be also formed in a pillar shape so as to be inserted in the second inserting portion 38A, so that the structure of the motor side wire 316C and the drive circuit side wire 318C may be simplified. Since the motor chamber 13A and the accommodating chamber 20A are not in communication with each other through the first recess 36A and the second recess 36B, the conductive members 36 and the adhesive members 25 cooperate to form the hermetic terminal unit 30A that serves as a female terminal.

The above embodiments may be modified into various alternative embodiments as exemplified below. According to the present invention, the number of the motor side wires 16C, 316C is not limited to three. In the case that the number of the motor side wires 16C, 316C is other than three, as many conductive members 26, 36 and drive circuit side wires 18C, 318C as the motor side wires 16C, 316C are used.

According to the present invention, the end wall 13E may have therethrough holes through which the conductive members 26, 36 are inserted. In this case, the conductive members 26, 36, the first connecting terminals 27, 37, and the second connecting terminals 28, 38 cooperate to form the hermetic terminal unit, respectively and a seal member is provided between each hermetic terminal unit and the inner wall of each hole.

The shape of the through hole 21 is not limited. According to the present invention, the seal member 24 may be configured to bond the support member 22 and the end wall 13E together. According to the present invention, the structure for connecting the first connecting terminals 27, 28 to the motor side wires 16C, 316C, respectively, may not necessarily be the same as that for connecting the second connecting terminals 28, 38 to the drive circuit side wires 18C, 318C, respectively.

According to the present invention, the conductive members 26, 36, the first connecting terminals 27, 37, and the second connecting terminals 28, 38 may be integrally formed, respectively. Furthermore, the cover 20 may be made of a resin.

According to the present invention, the cover 20 may be fixed to the peripheral wall of the suction housing 13 and the motor drive circuit 18 may be accommodated in the accommodating chamber 20A formed between the peripheral wall of the suction housing 13 and the cover 20. In this case, the peripheral wall of the suction housing 13 serves as a separation wall separating the motor chamber 13A and the accommodating chamber 20A from each other.

In the electric compressor 10 according to the above-described embodiments, the compression mechanism 15, the electric motor 16, and the motor drive circuit 18 are disposed in this order in the axial direction of the rotary shaft 17. According to the present invention, however, the electric motor 16, the compression mechanism 15, and the motor drive circuit 18 may be disposed in this order in the same axial direction of the rotary shaft 17. In other words, the electric motor 16, the compression mechanism 15, and the motor drive circuit 18 may be disposed along the direction of the axis of the rotary shaft 17 of the electric compressor 10.

In the electric compressor 10 according to the above-described embodiments, the compression mechanism 15 includes the fixed scroll and the movable scroll. According to the present invention, however, the electric compressor 10 may be of a piston type or a vane type.

According to the present invention, the electric compressor 10 is applicable to air-conditioners other than that for a vehicle.

What is claimed is:

1. An electric compressor comprising:
   a housing;
   a compression mechanism accommodated in the housing and compressing refrigerant;
   an electric motor driving the compression mechanism;
   a motor chamber formed in the housing to accommodate the electric motor;
   a cover mounted to the housing;
   an accommodating chamber formed between the housing and the cover;
   a motor drive circuit accommodated in the accommodating chamber and driving the electric motor;
   a separation wall forming part of the housing and separating the motor chamber and the accommodating chamber;
   a through hole formed through the separation wall;
   a motor side wire that is electrically connected to the electric motor;
   a drive circuit side wire that is electrically connected to the motor drive circuit;
   a hermetic terminal unit that is electrically connected to the motor side wire and the drive circuit side wire and inserted through the through hole; and
   a seal member provided between the hermetic terminal unit and an inner wall forming the through hole,
   wherein the hermetic terminal unit has a first connecting terminal that is electrically connected to the motor side wire and elastically deformable, a second connecting terminal that is electrically connected to the drive circuit side wire and elastically deformable, and a conductive member that is fitted to the first connecting terminal and the second connecting terminal and electrically connects the first connecting terminal and the second connecting terminal,
   wherein the first connecting terminal is elastically deformed and holds the motor side wire by a restoring force thereof, and wherein the second connecting terminal is elastically deformed and holds the drive circuit side wire by a restoring force thereof, and
   wherein a structure for connecting the first connecting terminal to the motor side wire is the same as a structure for connecting the second connecting terminal to the drive circuit side wire.

2. The electric compressor according to claim 1, wherein the conductive member is of a pillar shape, wherein one end of the conductive member extends into the motor chamber and the other end of the conductive member extends into the accommodating chamber, and wherein the first connecting terminal is provided at the one end of the conductive member and the second connecting terminal is provided at the other end of the conductive member.

3. The electric compressor according to claim 1, wherein the conductive member has a first recess that opens toward the motor chamber and accommodates the first connecting terminal and a second recess that opens toward the accommodating chamber and accommodates the second connecting terminal, wherein the first connecting terminal has a first inserting portion in which the motor side wire is inserted, wherein the second connecting terminal has a second inserting portion in which the drive circuit side wire is inserted, and wherein the second recess is not in communication with the first recess.

4. The electric compressor according to claim 1, wherein the conductive member is provided in plurality, wherein the hermetic terminal unit includes a support member having a plurality of insertion holes in which the respective conductive members are inserted, wherein the seal member is provided between the support member and an inner wall forming the through hole, and wherein a plurality of second seal members are provided between inner walls forming the insertion holes and the respective conductive members.

5. The electric compressor according to claim 1, wherein the compression mechanism, the electric motor, and the motor drive circuit are disposed along a direction of an axis of a rotary shaft of the electric compressor.

6. An electric compressor comprising:
a housing;
a refrigerant compressor accommodated in the housing;
an electric motor driving the refrigerant compressor;
a motor chamber formed in the housing to accommodate the electric motor;
a cover mounted to the housing;
an accommodating chamber formed between the housing and the cover;
a motor drive circuit accommodated in the accommodating chamber and driving the electric motor;
a separation wall forming part of the housing and separating the motor chamber and the accommodating chamber;
a through hole formed through the separation wall;
motor side wires electrically connected to the electric motor;
motor side female terminals correspondingly mounted to respective ends of each of the motor side wires;
drive circuit side wires electrically connected to the motor drive circuit;
drive circuit side female terminals correspondingly mounted to respective ends of each of the drive circuit side wires;
a hermetic terminal unit electrically connected to the motor side wires and the drive circuit side wires and inserted through the through hole; and
a seal provided between the hermetic terminal unit and an inner wall forming the through hole,
wherein the hermetic terminal unit includes:
a support member having insertion holes spaced from each other;
conductive members that extend through each of the insertion holes such that first ends of the conductive members extend into the motor chamber and second ends of the conductive members extend into the accommodating chamber;
first connecting terminals mounted to the first ends of the conductive members and insertable into the motor side female terminals; and
second connecting terminals mounted to the second ends of the conductive members and insertable into the drive circuit side female terminals,
wherein the first connecting terminals and the second connecting terminals each include a curved portion that is elastically deformable inward and mounted to the respective ends of the conductive members such that when the first connecting terminals and the second connecting terminals are inserted into the motor side female terminals and the drive circuit side female terminals, respectively, the curved portion is elastically deformed inward to press against the motor side female terminals and the drive circuit side female terminals so that the first connecting terminals and the second connecting terminals are electrically connected to the motor side wires and the drive circuit side wires, respectively.

* * * * *